United States Patent
Gupta et al.

(10) Patent No.: US 10,891,698 B2
(45) Date of Patent: Jan. 12, 2021

(54) RANKING APPLICATIONS FOR RECOMMENDATION TO SOCIAL NETWORKING SYSTEM USERS

(71) Applicant: Facebook, Inc., Menlo Park, CA (US)

(72) Inventors: Vishu Gupta, Atherton, CA (US); Wei Wu, Sunnyvale, CA (US); Jin You, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 929 days.

(21) Appl. No.: 14/542,460

(22) Filed: Nov. 14, 2014

(65) Prior Publication Data
US 2016/0140670 A1 May 19, 2016

(51) Int. Cl.
| | | |
|---|---|---|
| *G06Q 50/00* | (2012.01) | |
| *H04L 29/08* | (2006.01) | |
| *G06Q 30/02* | (2012.01) | |
| *H04W 4/21* | (2018.01) | |

(52) U.S. Cl.
CPC ......... *G06Q 50/01* (2013.01); *G06Q 30/0201* (2013.01); *H04L 67/22* (2013.01); *H04W 4/21* (2018.02)

(58) Field of Classification Search
None
See application file for complete search history.

(56) References Cited

U.S. PATENT DOCUMENTS

| | | | | |
|---|---|---|---|---|
| 9,319,373 B1* | 4/2016 | Kerr | ......................... | H04L 51/32 |
| 2010/0049534 A1* | 2/2010 | Whitnah | ................ | G06Q 30/02 |
| | | | | 705/319 |
| 2011/0231240 A1* | 9/2011 | Schoen | .................... | H04L 51/32 |
| | | | | 705/14.41 |
| 2012/0254902 A1* | 10/2012 | Brown | .................... | G06F 9/541 |
| | | | | 719/328 |
| 2013/0339345 A1* | 12/2013 | Soto Matamala | .... | G06F 16/248 |
| | | | | 707/722 |
| 2015/0149261 A1* | 5/2015 | Walkingshaw | .. | G06Q 10/06395 |
| | | | | 705/7.41 |

\* cited by examiner

*Primary Examiner* — Akosua Kyereme-Tuah
(74) *Attorney, Agent, or Firm* — Fenwick & West LLP (57) ABSTRACT

A social networking system obtains information describing one or more interactions performed by users of the social networking system with various applications. The information identifies users, applications, and interactions by users with applications. Based on the obtained information, the social networking system determines likelihoods of a selected user performing another type of interaction with each application in a set of applications. The set of applications are ranked based on the determined likelihoods, and one or more of the applications from the set are selected based on the ranking. Information describing the selected one or more applications is then provided to the selected user.

20 Claims, 3 Drawing Sheets

RANKING APPLICATIONS FOR RECOMMENDATION TO SOCIAL NETWORKING SYSTEM USERS

BACKGROUND

This disclosure relates generally to social networking systems, and more specifically to ranking applications for users of a social networking system.

Many online systems rank applications (e.g., games, tools, etc.) to recommend applications to their users. Based on a ranking of applications, an online system may recommend applications to a user in which the users are likely to have an interest or with which the user is likely to interact. For example, an online system recommends game applications that have been played by other online system users with a highest frequency to a user. Recommending applications to its users allows an online system to increase user interaction with the online system.

However, conventional online systems consider a limited number of features when ranking applications. For example, user activity within in third-party applications is not accessible to conventional online systems when ranking and recommending applications to users. Additionally, indirect user interactions with applications (e.g., user responses to advertisements related to the applications, user activity in content maintained by an online system and related to various applications, etc.) are also not used by conventional online systems when ranking or recommending applications.

SUMMARY

To more accurately recommend applications to a user, an online system (e.g., a social networking system) ranks applications for the user of the online system based on the likelihoods of the user performing types of interaction with various applications (e.g., installing the applications on a client device). Example interactions with an application include: making a purchase via the application, interacting with one or more advertisements presented via the application, interacting with an additional user via the application, and an amount of usage of the application.

To determine likelihoods of the user performing types of interactions, the online system obtains information describing one or more interactions performed by one or more users of the social networking system with one or more applications. For example, the online system provides a software development kit ("SDK") to third-party systems, such as application developers, including instructions for inclusion in one or more applications. When the instructions are executed by an application, the application communicates information describing interactions with the application, information identifying the application, and information identifying an online system user performing the application to the online system. For example, an application communicates information identifying types of products a user purchased in the application, times of day the user interacted with the application, and a number of interactions between the user and other users via the application to the online system.

In various embodiments, the online system applies one or more machine-learned models to information describing prior interactions by a user with one or more applications to determine likelihoods of the user performing one or more type of interactions with an application. For example, different machine-learned models are associated with different types of interactions and applied to prior interactions between the user and one or more applications to determine likelihoods of the user performing different types of interactions with one or more applications. Prior interactions between the user and additional applications having at least a threshold measure of similarity to an application may be also used to determine likelihoods of the user performing different types of interactions with the application. Alternatively or additionally, if less than a threshold amount of information describing interactions by the user with the one or more applications has been received by the online system, information describing interactions by one or more additional users with at least a threshold measure of similarity with the user with the one or more applications may be used by the online system to determine likelihoods of the user performing various types of interactions with the one or more applications.

Based on the determined likelihoods of the user performing the types of interactions with the one or more applications, the online system ranks the one or more applications. For example, if the user is more likely to perform one or more types of interaction with an application than with another application, the application is ranked higher than the other application by the online system. Based on the ranking, the online system identifies one or more of the applications to the user. For example, the online system identifies applications having at least a threshold position in the ranking or having the highest positions in the ranking for identification to the user as recommendations. In some embodiments, the online system presents links to the one or more identified applications to the user.

In some embodiments, the online system obtains information describing interactions by users of the online system with one or more objects related to the one or more applications. The social networking system identifies one or more objects related to the one or more applications. Examples of objects related to an application include: include an advertisement related to the application, a web page related to the application, a group related to the application, a post to the online system related to the application, and an event related to the application. Information describing interactions performed by users of the online system with one or more objects related to the one or more applications may be received. The online system retrieves interactions performed by a selected user of the online system with the one or more objects related to the one or more applications and determines likelihoods of the user performing one or more types of interactions with the one or more applications based on the information describing interactions by the user with the one or more objects related to the one or more applications. In various embodiments, the online system applies machine-learned models to interactions between the user and the one or more objects related to the one or more applications to determine likelihoods of the user performing one or more type of interactions with the one or more applications. For example, based on the user's interactions with advertisements associated with an application, content associated with an application posted to the online system, groups maintained by the online system and associated with an application, the online system determines how likely the user is to install the application on a client device.

In some embodiments, the online system determines one or more amounts that a user is likely to spend via one or more applications based on information describing interactions by the user with the one or more applications. For example, the online system applies machine-learned models to prior interactions between the user and the one or more applications to determine an amount of money that the user is likely to spend via the one or more applications, a number of times that the user is likely to interact with the one or more applications, an amount of time that the user is likely to spend at least a threshold amount via the one or more applications, a number of other users with whom the user is likely to interact via the one or more applications, or other suitable values. The online system ranks and recommends the one or more applications based on the amounts that the user is likely to spend via the one or more applications. For example, the online system recommends one or more applications with which the user is likely to spend at least a threshold amount of time interacting or through which the user is likely to spend at least a threshold amount of money to the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
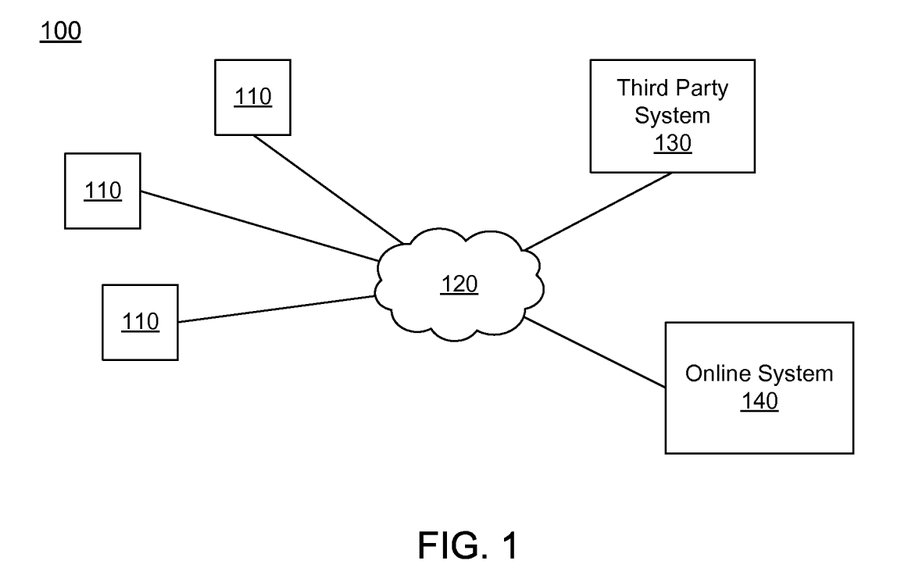
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, information describing a group of users of the online system 140, or information about an application provided by the third party system 130. In some embodiments, a third party system 130 may communicate information directly to the online system 140.

Figure 2:
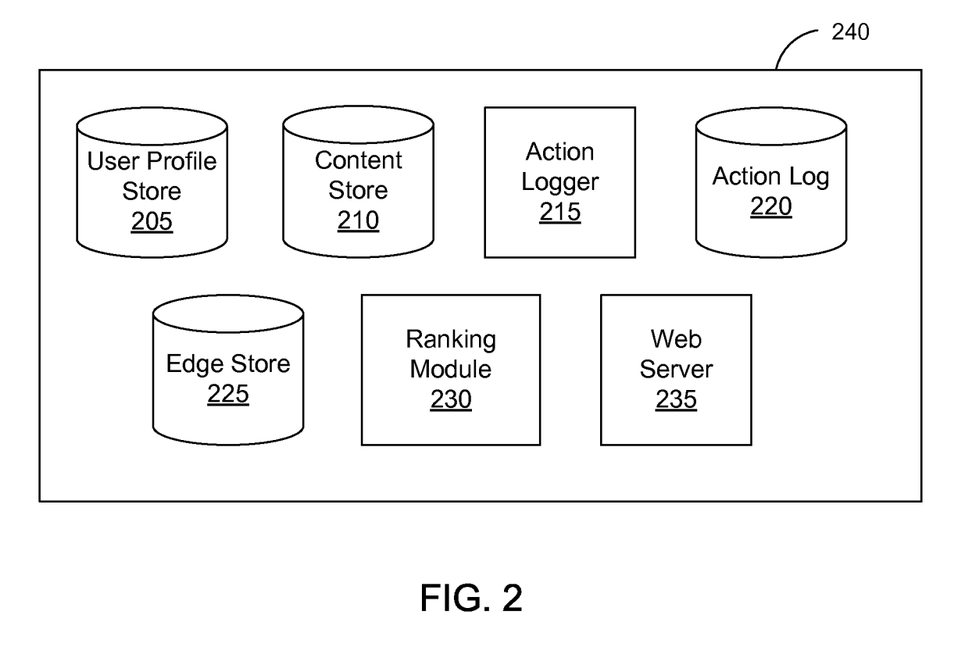
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, a ranking module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

Information associating user interactions with applications may be stored in the user profile store 205. For example, if an online system user installs an application on a client device 110 or other platform, information describing the installation and identifying the application are stored in association with a user profile of the user. Additionally, when the online system user performs various types of interactions with the application, the application communicates information describing the interactions and identifying the user to the online system 140. For example, if the user uses information maintained by the online system 140 to access the application, the application communicates information identifying the user and describing one or more interactions with the application to the online system 140, which identifies the user profile associated with the user and stores the information identifying the interactions with the application in association with the user profile of the user. Additionally, the online system 140 may retrieve information associated with the user and communicate the retrieved information to the application subject to one or more privacy settings associated with the user's user profile that regulate access to information associated with the user and maintained by the online system 140. An application may be a native application or a standalone application installed for example, on a client device 110, or may be embedded in another application or web page accessed by a user of the online system.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Content items may be received from applications separate from the online system 140 that communicate information to the online system 140. Hence, online system users are encouraged to communicate with each other by posting text and content items of various types of media to the online system 140 through various communication channels. This increases the amount of interaction of users with each other and increases the frequency with which users interact within the online system 140.

Certain objects in the content store 210 may be identified as associated with one or more applications. For example, an object associated with an application is an advertisement identifying the application. As another example, an object associated with a gaming application is a web page describing the gaming application. The web page may include a link for purchasing the gaming application, an image showing the gaming application, text describing installation or use of the gaming application, etc. Alternatively and additionally, an object related to an application may be group associated with the application and including one or more users of the online system 140. However, any other suitable type of object may be associated with an application and maintained in the content store 210. For example, content posted to the online system 140 identifying an application or relating to the application is identified as associated with the application or an invitation related to the application are identified as associated with the application. In various embodiments, an application identifier specifying an application is associated with an object associated with the application to allow the online system 140 to identify objects associated with the application.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), interacting with an advertisement, and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences. As described above, one or more objects may be associated with an application, allowing the online system 140 to identify interactions with applications based on interactions with objects associated with various applications.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The ranking module 230 determines likelihoods of a user performing various types of interactions with applications based on data describing prior interactions by the user with applications or based on prior interactions by additional users with one or more applications. Instructions included in one or more applications communicate information describing a user's interactions with the applications to the online system 140, which stores information describing the interactions with the applications. For example, the online system 140 provides a software development kit (SDK) to third party systems 130, which include the SDK in applications, so when an application executes instructions included in the SDK, the application communicates information describing interactions with the application by online system users to the online system 140. To predict a likelihood of a user performing a type of interaction with an application, the ranking module 230 applies one or more machine-learned models to received information describing a user's prior interactions with the application, or to received information describing the user's prior interactions with other applications. For example, the ranking module 230 applies one or more machine-learned models to information describing a user's prior interactions with a gaming application (e.g., playing the gaming application, accessing reviews associated with the gaming applications, providing comments about the gaming application to the online system 140) to determine a likelihood of the user performing another type of interaction (e.g., installing on a client device 110) with the gaming application. If application is a game or otherwise stores information describing a state of a user within the application, information describing user interaction with the application may identify the state of the user within the application. A state of a user within an application describes the user's relationship with features or content provided by the application. Examples of a state of a user within an application include: a game level associated with the user, achievements in a game associated with the user, a score associated with the user, features provided by the game to the user, or some combination thereof.

In one embodiment, the ranking module 230 determines a likelihood of the user performing a type of interaction with an application based in part on prior interactions by the user with the application or by the user with other applications. Additionally, prior interactions by additional online system users having at least a threshold measure of similarity to the user with the application may be used to determine the likelihood of the user performing the type of interaction with the application. For example, the online system 140 stores information associating an application with social networking system users in the user profile store 205 and information describing users' interactions with the application in the action log 220. The ranking module 230 identifies a user associated with the application and also identifies additional users having at least a threshold number or percentage of characteristics (e.g., age, gender, and geographic region) matching characteristics of the identified user. Based on interactions with the application by the additional users, the ranking module 230 determines likelihoods of the user performing one or more types of interaction with the application.

The ranking module 230 may identify additional users as users who have installed applications having at least a threshold measure of similarity to applications installed by the user. For example, the ranking module 230 identifies an additional user having installed one or more applications on a client device 110 that have at least a threshold number or percentage of characteristics matching characteristics of one or more applications installed on a client device 110 by the user. Example characteristics of an application include: an application developer, a function of the application (e.g., electronic book reader, media player, etc.), a category of the application (e.g., finance, entertainment, gaming, educational, etc.), or any other suitable information.

In some embodiments, the ranking module 230 identifies interactions by additional users with an application if the online system 140 includes less than a threshold amount of interaction with the application by the user (e.g., if the user recently installed the application or has infrequently interacted with the application). Similarly, a user's interactions with additional applications having at least a threshold similarity to an application may be used to determine likelihoods of the user performing one or more types of interactions with the application. For example, a user's likelihood of making a purchase via an application is determined based on prior purchases made by the user via additional applications of the same genre as the application.

Additionally, interactions by the user, or additional users having at least a threshold measure of similarity with the user, with one or more objects associated with an application may be used to determine a likelihood of the user performing an interaction with the application. Similarly, interactions by the user, or by additional users, with objects associated with one or more additional applications having at least a threshold measure of similarity with the application may be used when determining a likelihood of the user performing one or more types of interactions with the application. For example, a user's likelihood of making a purchase via an application is determined based on prior purchases, via the application or via additional applications having at least a threshold similarity to the application, made by additional users who are connected to the user. The additional applications may be associated with a similar genre as the application or with a similar genre as applications with which the user frequently interacts. Information used by the ranking module 230 to determine likelihoods of the user performing one or more interactions with an application may be retrieved from the action log 220, the content store 210, from a third party system 130, or from any suitable source.

In one embodiment, interactions with the objects associated with an application and interactions with the application are both used by the ranking module 230 to determine a likelihood of the user performing a type of interaction with the application (e.g., installing the application, making a purchase via the application, using the application, inviting additional users to install or use the application, etc.). The ranking module 230 may apply one or more machine-learned models to data describing the user's prior interactions with an application as well as interactions with objects associated with the application to determine the likelihood of the user performing a type of interaction with the application. Similarly, prior interactions between the user and additional applications may be used along with prior interactions between the user and an application to determine the likelihood of the user performing one or more types of interactions with the application.

Based on the determined likelihoods of the user performing one or more types of interactions with one or more applications, the ranking module 230 ranks the one or more candidate applications. For example, if the ranking module 230 determines the likelihoods of the user installing a game A, a game B, a game C and a game D on a client device 110 are 70%, 60%, 55% and 30%, the ranking module 230 ranks the games in the order of: game A, game B, game C and game D. Hence, the ranking indicates the likelihood of the user installing the different games, with higher positions in the ranking corresponding to higher likelihoods of installation. In some embodiments, the online system 140 identifies applications having at least a threshold position in the ranking or having highest positions in the ranking to the user.

In one embodiment, to rank applications, the ranking module 230 determines one or more amounts that a user is likely to spend via one or more applications based on information describing interactions by the user or of additional users with the one or more applications. Example amounts a user is likely to spend via an application include: an amount of money that the user is likely to spend via the application, a number of times that the user is likely to interact with the application, an amount of time that the user is likely to spend interacting with the application, and a number of other users with whom the user is likely to interact via the application. In one embodiment, the ranking module 230 uses information describing interactions by additional users or interactions by the user with additional applications to determine one or more amounts the user is likely to spend via an application. Interactions with objects associated with one or more applications may also be used to determine one or more amounts the user is likely to spend via an application.

In one embodiment, the ranking module 230 ranks the one or more applications based on the one or more amounts that the user is likely to spend via one or more applications, and recommends to the user the applications based on the ranking. For example, if the ranking module 230 determines that the user is likely to spend $10 via game A, $6 via game B, $4 via game C, and $2 via game D, then the ranking module 230 ranks the games in the order of A, B, C, and D. Hence, higher positions in the ranking correspond to higher amounts that the user is likely to spend. As another example, the one or more applications are ranked based on the likelihood of the user engaging with the application (e.g., the amount of time the user spends interacting with an application). Applications with which the user is more likely to spend time interacting are ranked higher. Applications having at least a threshold position in the ranking or having highest positions in the ranking are presented to the user.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that is stored in the content store 210. Additionally, the web server 235 may provide application programming interface (API) functionality to send data directly to native client device operating systems, such as IOS®, ANDROID™, WEBOS® or BlackberryOS.

Figure 3:
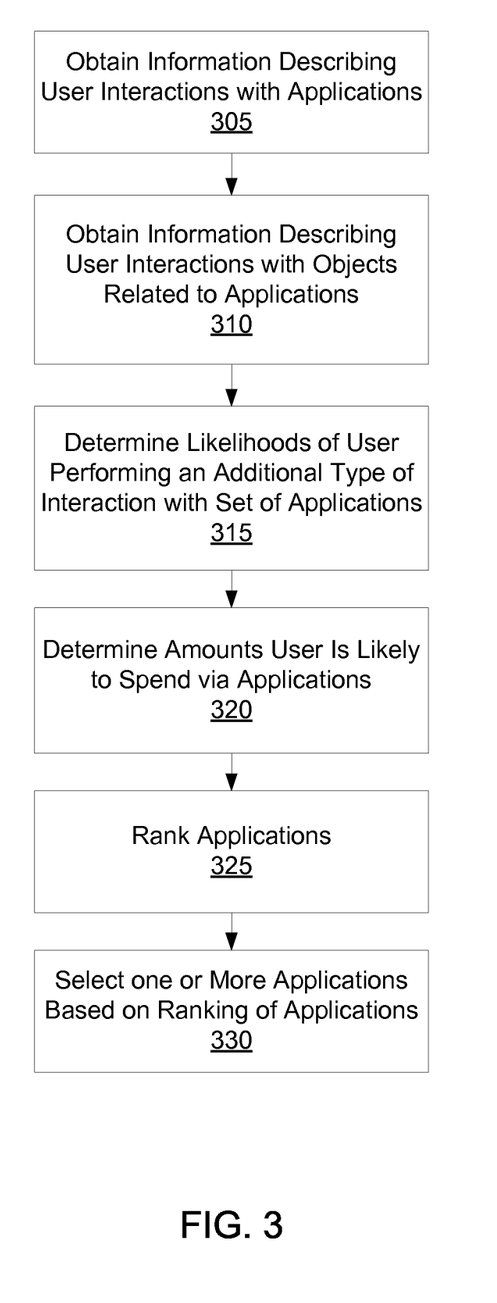
FIG. 3 is a flow chart of a method for recommending applications to user based on historical user interactions with applications, in accordance with an embodiment.

Recommending Applications to User Based on Historical User Interactions with Applications FIG. 3 is a flow chart of one embodiment of a method for recommending applications to user based on historical user interactions with applications. In various embodiments, the method may include different and/or additional steps, or fewer steps, than those depicted in FIG. 3. Additionally, the method may perform steps in different orders than the order described in conjunction with FIG. 3.

Figure 4:
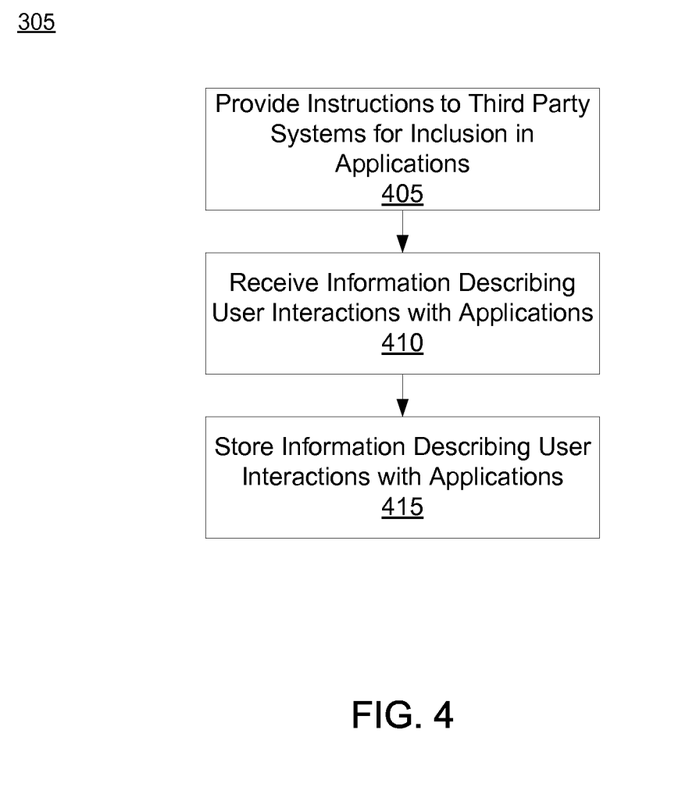
FIG. 4 is a flow chart of a method for obtaining information describing historical user interactions with applications, in accordance with an embodiment.

The online system 140 obtains 305 information describing user interactions with one or more applications. The applications may be executed by a third party system 130 that communicates information describing interaction with the application to the online system. Referring to FIG. 4, a flowchart of a method for obtaining 305 information describing user interactions with one or more applications is shown. The online system 140 provides 405 instructions to one or more third party systems 130, such as application developers, that, when executed by a processor, communicate information describing user interactions with an application to the online system 140. The third party system 130 includes the instructions in an application, and when the instructions included in the application are executed by a client device 110 or by the third party system 130, information identifying the application, identifying a user interacting with the application, and describing the user's interactions with the application is communicated from the application to the online system 140. For example, the online system 140 provides 405 a software development kit (SDK) that includes instructions that, when executed, communicate information describing user interactions with an application to a third-party system 130.

The online system 140 receives 410 information describing user interactions with one or more applications when the applications execute the instructions. Information received from an application includes information identifying the application. Examples of information identifying an application include: an identifier associated with the application, a title of the application, a genre associated with the application, and a third party system 130 associated with the application (e.g., a developer of the application). The received information also includes information identifying a user of the online system 140 interacting with an application. For example, the application communicates an identifier associated with the user of the online system 140 to the online system 140, which retrieves additional information associated with the user from the identifier (e.g. an age, a gender, and a geographic location of the user). Alternatively, the application communicates information identifying the user (e.g. an age, a gender, and a geographic location of the user) to the online system 140. Additionally, if the user uses the online system 140 to access the application, the information from the application includes a user identifier, which the online system 140 uses to retrieve information from a user profile for the user maintained by the online system 140.

The received information describes a user's interactions with an application. Information describing user interaction with an application includes: a time a user opened or closed the application, a length of time the user accessed the application, a number of times the application crashed, information describing purchase made by the user via the application. Additionally, the received information may identify a state of the user within the application. If the application is a game, a state of the user within the application may identify a level associated with the user, achievements in the game associated with the user, user scores, or other suitable information. Purchases made via the application may be described using a time the user made a purchase via the application, an amount of the user's purchase via the application, a type of product the user purchased via the application, or other suitable information. Information describing user interaction with an application may also include information associated with advertisements presented to a user via the application. For example, the online system 140 receives 410 information indicating: a time when a user was presented with an advertisement via an application, a number of times the user was presented with advertisements via the application, a number of times the user interacted with advertisements presented via the application, or a number of a specific type of interaction by the user with advertisements presented via the application (e.g., purchases from interacting with an advertisement, applications installed by the user via interaction with an advertisement presented via the application). Received information describing user interaction with an application may also include information associated with interactions between users via an application (e.g., a number of additional users a user invited to use an application, a number of messages sent by the user to additional users via the application, a number of connections formed between the user and additional users via the application, etc.). The online system 140 may store 415 information about a user's interactions with an application and information identifying the user that performed the interactions.

Referring back to FIG. 3, the online system 140 also obtains 310 information describing user interactions with objects associated with applications. In one embodiment, the online system 140 identifies one or more objects associated applications and obtains 310 data describing user interactions with the one or more objects. For example, the online system 140 identifies advertisements associated with an application presented by the online system 140 or presented by an entity that exchanges information with the online system 140. When a user interacts with the advertisements (e.g., accessing links included in the advertisements) the online system 140 obtains 310 data describing the user interaction with the advertisements associated with the application. In another embodiment, the online system 140 provides a software development kit (SDK) to third party systems 130, which includes instructions from the SDK in objects associated with applications that, when executed, communicate information describing one or more interactions with the objects to the online system 140.

Based on the obtained information describing user interaction with one or more applications and/or information describing user interactions with objects associated with the one or more applications, the online system 140 determines 320 likelihoods that the user will perform one or more types of interaction with at least a set of the one or more applications. The online system 140 determines 315 a likelihood of the user performing a type of interaction with an application based on prior interactions the user performed with the application or with additional applications, such as additional applications having at least a threshold number or percentage of characteristics matching characteristics of the application. The online system 140 may alternatively determine 315 a likelihood of the user performing a type of interaction with an application based on information describing user interactions with objects associated with applications or based on a combination of information describing prior interactions with one or more applications and prior interactions with objects associated with one or more applications. For example, the online system 140 determines 315 the likelihood that a user will install a new shopping application based on the user's prior installations of other shopping applications and/or based on the user's interaction with one or more objects associated with the shopping application or associated with additional shopping applications. One or more machine-learned models may be used to determine 315 a user's expected likelihoods of performing a type of interaction with an application based on the user's prior interactions with the application or based on the user's prior interactions with additional applications having a threshold measure of similarity to the application (i.e., a threshold number or percentage of characteristics matching characteristics of the application), or based on the user's interactions with one or more objects associated with the application. Different machine-learned models may be used to determine 315 likelihoods of the user performing different types of interactions.

In one embodiment, prior interactions with one or more applications (or with one or more objects associated with the one or more applications) by additional users having at least a threshold similarity to the user (i.e., additional users having at least a threshold number or percentage of characteristics matching characteristics of the user) are used to determine 315 the likelihoods of the user performing one or more types of interactions with an application. For example, prior interactions with one or more applications by additional users having at least a threshold number or percentage of characteristics (e.g., age, gender, geographic region) matching characteristics of a user are retrieved and used to determine 315 likelihoods of the user performing various types of interactions with an application. In some embodiments, interactions by additional users with one or more applications (or with one or more objects related to the one or more applications) are used to determine 315 likelihood of a user performing a type of interaction with an application if the online system 140 obtains 305 less than a threshold amount of information describing interactions with the application (or with one or more objects related to the application) associated with the user. Interactions with an application by additional users may be weighted based on measures of similarity between the additional users and the user. A measure of similarity between a user and an additional user may be based on a percentage of characteristics of the additional user matching characteristics of the user. A weight associated with interactions by the additional user with an application or with objects associated with an application may be proportional to the measure of similarity between the user and the additional user. In some embodiments, additional users are identified based in part on a measure of similarity between applications installed by the user on a client device 110 and applications installed on client devices 110 associated with the additional users. For example, additional users are identified as users who installed at least a threshold number of applications having at least a threshold number or percentage of characteristics (e.g., a name of the application developer, a function of the application, a category of the application) application characteristics of applications installed by the user.

Likelihoods of the user performing one or more types of interactions with an application may also be determined 315 based on prior interactions by the user with additional applications having at least a threshold measure of similarity to the application or by prior interactions by the user with objects associated with additional applications having at least a threshold measure of similarity to the application. For example, prior interactions by the user with one or more additional applications having at least a threshold number or percentage of characteristics (e.g., genre, target audience) matching characteristics of an application are retrieved and used to determine 315 likelihoods of the user performing various types of interactions with the application. Interactions by the user with one or more additional applications may be retrieved and used to determine 315 likelihoods of the user performing various types of interactions with an application if less than a threshold amount of information describing one or more types of interactions by the user with the application is maintained by the online system 140. Interactions with an additional application by the user may be weighted based on a measure of similarity between the additional application and the application. The measure of similarity may be based on a percentage of characteristics of the additional application matching characteristics of the application. In some embodiments, the weight associated with interactions with the additional application is proportional to the measure of similarity between the additional application and the application.

In some embodiments, the online system 140 determines 320 one or more amounts the user is likely to spend via one or more applications in the set from the one or more applications based on the information describing the user's prior interactions with the one or more applications (or additional applications having at least a threshold measure of similarity to the one or more applications) and/or based on the information describing the user's interactions with one or more objects associated with the one or more applications. The amount the user is likely to spend on an application may be determined 320 as a minimum, a maximum, or a range. For example, the online system 140 determines 320 that a user is likely to spend a minimum of $2 per month in a social game application. As an alternative example, the online system 140 determines 320 that a user is likely to spend a minimum of $1 and a maximum of $5 in a shooting game application per month.

Based on the determined likelihoods of the user performing a type of interaction with the applications and/or values that the user is likely to spend on the applications, the online system 140 ranks 325 the applications. For example, if the online system 140 determines 320 the user is likely to spend less than $0.50 via application A, between $0.50 and $2.00 via an application B, between $2.00 and $5.00 via an application C, or more than $5.00 via an application D, the online system 140 ranks 325 the applications in the order of the application D, application C, application B and application A. Hence, higher positions in the ranking correspond to applications with which the user is more likely to perform a type of interaction or with which the user is likely to spend greater amounts.

Likelihoods of the user performing multiple types of interactions with applications may be determined 315 and used to rank 325 applications in the set from the one or more applications. For example, a machine-learned model generates a score for various applications based on likelihoods of the user performing various types of interactions. In some embodiments, the machine-learned model accounts for a probability of the user installing an application, a likelihood of the user interacting with the application, purchases made via the application, a genre or category of the application, interactions with content associated with the application (e.g., stories, advertisements). Various information associated with the user or with additional users may be used by the machine-learned model. For example, information describing prior installations of applications by the user or by additional users (e.g., users connected to the user), interaction with applications by additional users connected to the user, purchased made by the user or by additional users via the application (or similar applications), and any other suitable information are provided to the machine-learned model, which generates a score for the application. Various applications may be ranked 325 for presentation to the user based on their scores determined by the machine-learned model.

Similarly, multiple amounts the user is likely to spend via applications may be determined 320 and used to rank 325 the applications. In some embodiments, the likelihoods of the user performing types of interactions with applications may be combined with the values that the user is likely to spend via the applications, with the combination used to rank 325 to rank the applications. For example, the online system 140 ranks 325 applications based on: amounts of money the user is likely to spend per day via the applications, likelihoods of the user interacting with at least a threshold number of additional users via different applications, likelihoods of the user accessing at least 3 advertisements per week presented via the applications, and a number of times that the user is likely to access the applications per day.

Based on the ranking, the online system 140 selects 330 one or more applications and provides information identifying the selected one or more applications to the user. For example, the online system 140 selects 330 the highest ranked applications from the ranking or selects 330 applications having at least a threshold position in the ranking. The online system 140 may include information identifying one or more of the selected applications in a feed of content items presented to the user. In various embodiments, the online system 140 determines a number of applications selected 330 from the ranking based on information associated with the user.

Summary

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:

1. A method comprising:
   providing, by an online system, an application programming interface to one or more third party systems, each of the one or more third party systems providing an application for use to users of the online system and the application programming interface configured to communicate state information of a user of the online system corresponding to interactions the user made within the application to the online system;
   obtaining, at an online system, the state information through the application programming interface from the one or more third party systems describing the state of the user of the online system within one or more applications, the state information for an application describing a relationship between the user and one or more features inside of the application, the state information including one or more interactions performed by the user inside the one or more applications, identifying one or more types of the interactions performed inside the one or more applications, and identifying each of the one or more applications;
   determining a likelihood of the user performing an additional type of interaction with each application in a set of additional applications based at least in part on the obtained state information describing interactions by the user within the one or more applications;
   ranking each application in the set of additional applications based on the determined likelihood of the user performing the additional type of interaction;
   selecting one or more applications from the set based at least in part on the ranking; and
   providing information identifying the selected one or more applications to the user.

2. The method of claim 1, wherein obtaining, at the online system, information describing the one or more interactions by the user of the online system with the one or more applications comprises:
   providing one or more instructions to a third party system associated with an application for inclusion in the application, the instructions, when executed, communicate information describing interactions with the application to the online system; and
   receiving, at the online system, the information communicated from the application describing interactions with the application, the information identifying a user performing an interaction with the application, identifying the application, and describing the interaction.

3. The method of claim 2, wherein obtaining, at the online system, information describing the one or more interactions by the user of the online system with the one or more applications further comprises:
- storing the information communicated from the application at the online system; and
- retrieving the information communicated from the application.

4. The method of claim 1, wherein determining the likelihood of the user performing the additional type of interaction with each application in the set of additional applications based at least in part on the obtained information describing interactions by the user with the one or more applications comprises:
- obtaining information describing one or more interactions by the user of the online system with one or more objects associated with the one or more applications, the information further identifying each of the users and identifying each of the one or more applications; and
- determining the likelihood of the user performing the additional type of interaction with each application in the set of additional applications based at least in part on the obtained information describing interactions by the user with the one or more applications and on the obtained information describing interactions by the user with the one or more objects associated with the one or more applications.

5. The method of claim 4, wherein an object associated with an application of the one or more applications is selected from a group consisting of: an advertisement associated with the application, a web page associated with the application, a group maintained by the online system and associated with the application, content posted to the online system and associated with the application, and any combination thereof.

6. The method of claim 1, wherein determining the likelihood of the user performing the additional type of interaction with each application in the set of additional applications based at least in part on the obtained information describing interactions by the user with the one or more applications comprises:
- obtaining information describing interactions by the user with one or more additional applications each having at least a threshold measure of similarity with an application of the one or more applications; and
- determining the likelihoods of the user performing the additional type of interaction with each application in the set of additional applications based at least in part on the obtained information describing interactions by the user with the one or more applications.

7. The method of claim 1, wherein determining the likelihood of additional type of interaction with each application in the set of additional the one or more applications based at least in part on the obtained information describing interactions by the user with the one or more applications comprises:
- retrieving information describing interactions by one or more additional users having at least a threshold measure of similarity with the user with the set of additional applications responsive to the threshold measure of similarity being less than a threshold amount of obtained information describing interactions by the user with the one or more applications; and
- determining the likelihoods of the user performing the additional type of interaction with each application in the set of additional applications based at least in part on the retrieved information describing interactions by the user with the one or more applications and on the retrieved information describing interactions by the one or more additional users with the one or more applications.

8. The method of claim 1, wherein an interaction with an application is selected from a group consisting of: an installation of the application, a purchase made via the application, an interaction with an advertisement presented via the application, an interaction with another user of the online system via the application, an amount of usage of the application, and any combination thereof.

9. The method of claim 1, wherein selecting one or more applications from the set based at least in part on the ranking; comprises:
- selecting one or more applications having at least a threshold position in the ranking.

10. A method comprising:
- providing, by an online system, an application programming interface to one or more third party systems, each of the one or more third party systems providing an application for use to users of the online system and the application programming interface configured to communicate state information of a user of the online system corresponding to interactions the user made within the application to the online system;
- obtaining, at an online system, the state information through the provided application programming interface from the one or more third party systems describing the state of the user of the online system within one or more applications, the state information for an application describing a relationship between the user and one or more features inside of the application, the state information including one or more interactions performed by the user with the one or more applications, identifying one or more types of the interactions performed, and identifying each of the one or more applications;
- determining one or more amounts that a selected user from the one or more users is likely to spend via each application in a set of additional applications based at least in part on the obtained state information describing interactions by the user with the one or more applications and the identified one or more states;
- ranking the applications in the set of additional applications based on the one or more amounts that the selected user is likely to spend via each application in the set of additional applications;
- selecting one or more applications from the set based at least in part on the ranking; and
- providing information identifying the selected one or more applications to the user.

11. The method of claim 10, wherein an amount that the user is likely to spend via an application is selected from a group consisting of: an amount of money that the selected user is likely to spend via the application, a number of times that the user is likely to interact with the application, an amount of time that the user is likely to spend interacting with the application, a number of other users of the online system with whom the user is likely to interact via the application, and any combination thereof.

12. The method of claim 10, wherein determining one or more amounts that the user is likely to spend via each application in the set of additional applications based at least in part on the obtained information describing interactions by the user with the one or more applications comprises:
- obtaining information describing interactions by the user with one or more additional applications each having at least a threshold measure of similarity with an application in the set of the one or more applications; and determining the one or more amounts that the user is likely to spend via each application in the set of the one or more applications based at least in part on the obtained information describing interactions by the user with the set of the one or more applications and on the obtained information describing interactions by the user with the one or more additional applications.

13. The method of claim 10, wherein determining one or more amounts that the user is likely to spend via each application in the set of additional applications based at least in part on the obtained information describing interactions by the user with the one or more applications comprises:

retrieving information describing interactions by one or more additional users having at least a threshold measure of similarity with the user with the set of additional applications responsive to the threshold measure of similarity being less than a threshold amount of obtained information describing interactions by the selected user with the set of the one or more applications; and determining the one or more amounts that the selected user is likely to spend via each application in the set of additional applications based at least in part on the obtained information describing interactions by the selected user with the set of the one or more applications on the retrieved information describing interactions by the one or more additional users.

14. The method of claim 10, wherein an interaction with an application is selected from a group consisting of: an installation of the application, a purchase made via the application, an interaction with an advertisement presented via the application, an interaction with another user of the online system via the application, an amount of usage of the application, and any combination thereof.

15. The method of claim 10, wherein selecting one or more applications from the set based at least in part on the ranking; comprises:

selecting one or more applications having at least a threshold position in the ranking.

16. A computer program product comprising a computer readable storage medium having instructions encoded thereon that, when executed by a processor, cause the processor to:

provide, by an online system, an application programming interface to one or more third party systems, each of the one or more third party systems providing an application for use to users of the online system and the application programming interface configured to communicate state information of a user of the online system corresponding to interactions the user made within the application to the online system;

obtain, at an online system, the state information through the application programming interface from the one or more third party systems describing the state of the user of the online system within one or more applications, the state information for an application describing a relationship between the user and one or more features of the application, the state information including one or more interactions performed by the user within the one or more applications, identifying one or more types of the interactions performed, and identifying each of the one or more applications;

determine a likelihood of the user performing an additional type of interaction with a set of additional applications based at least in part on the obtained state information describing interactions by the user within the one or more applications;

rank each application in the set of additional applications based on the determined likelihood of the user performing the additional type of interaction;

select one or more applications from the set based at least in part on the ranking; and provide information identifying the selected one or more applications to the user.

17. The computer program product of claim 16, wherein an object associated with an application in the set of the one or more applications is selected from a group consisting of: an advertisement associated with the application, a web page associated with the application, a group maintained by the online system and associated with the application, content posted to the online system and associated with the application, and any combination thereof.

18. The computer program product of claim 16, wherein select one or more applications from the set based at least in part on the ranking comprises:

select one or more applications having at least a threshold position in the ranking.

19. The computer program product of claim 16, wherein determine the likelihood of the user performing an additional type of interaction with each application in the set of additional applications based at least in part on the obtained information describing interactions by the user with the one or more applications comprises:

obtain information describing interactions by the user with objects associated with the set of additional applications each having at least a threshold measure of similarity with an application in the one or more applications; and determine the likelihood of the user performing the additional type of interaction based at least in part on the obtained information describing interactions by the user with the one or more objects associated with the set of additional applications and on the obtained information describing interactions by the user with objects associated with the set of additional applications.

20. The method of claim 1, wherein the application is a game application and the state information for the game application comprises: a game level associated with the user, one or more achievements of the user in a game of the game application, or some combination thereof.

* * * * *

UNITED STATES PATENT AND TRADEMARK OFFICE
CERTIFICATE OF CORRECTION

PATENT NO. : 10,891,698 B2
APPLICATION NO. : 14/542460
DATED : January 12, 2021
INVENTOR(S) : Gupta et al.

Page 1 of 1

It is certified that error appears in the above-identified patent and that said Letters Patent is hereby corrected as shown below:

On the Title Page

Item (51), in Column 1, under "Int. Cl.", Line 1, after "G06Q" delete "50/00" and insert -- 50/01 --, therefor.

In the Claims

In Column 17, in Claim 7, Line 51, delete "of additional" and insert -- of the user performing the additional --, therefor.

In Column 17, in Claim 7, Line 52, after "additional" delete "the one or more".

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*